May 1, 1962 W. D. ROWE 3,032,664

NOR LOGIC CIRCUIT HAVING DELAYED SWITCHING
AND EMPLOYING ZENER DIODE CLAMP

Filed May 16, 1958 2 Sheets-Sheet 1

WITNESSES

Leon J. Taga

Myron E. Click

INVENTOR

William D. Rowe

BY

F. E. Browder

ATTORNEY

Forward Base-Emitter Input Voltage vs
Forward Base-Emitter Input Current

United States Patent Office 3,032,664

Patented May 1, 1962

3,032,664

NOR LOGIC CIRCUIT HAVING DELAYED SWITCHING AND EMPLOYING ZENER DIODE CLAMP

William D. Rowe, Snyder, N.Y., assignor to Westinghouse Electric Corporation, East Pittsburgh, Pa., a corporation of Pennsylvania Filed May 16, 1958, Ser. No. 735,796

8 Claims. (Cl. 307—88.5)

This invention relates to logic circuitry in general, and in particular to improved NOR logic circuits for logic control systems.

The advent of logic circuits brought with them great changes in the design of control systems for performing all manner of functions. One basic circuit which has found great application in industrial control is the NOR logic circuit.

In order to give a clear concept of the present invention, a general statement of the logic on which the NOR logic circuit is based follows. Assuming a voltage signal is represented by one, and the absence of a voltage signal is represented by zero, then a transistor NOR circuit may be expressed logically in the binary number system. The binary number system is based on a radix of 2 instead of a radix of 10 as in the decimal system. Therefore, only two numbers, zero and one, are required to form the combinations to represent all numbers. Following this system, a transistor NOR circuit provided with two inputs which we will designate A and B, may be analyzed in the following manner.

(1) If input A is zero and input B is zero, then an output C is one.

(2) If input A is zero and input B is one, the output C is zero.

(3) If input A is one and input B is zero, then output C is zero.

(4) If input A is one and input B is one, then output C is zero.

These four provisions may be combined in one statement. The output C is one only if neither input A noı input B is one. The key word in this statement is NOR, which expresses both a logic operation and negation. Therefore, this circuit is termed a NOR circuit and the logic will be called NOR logic.

The greater the number of inputs and outputs of a logic circuit, the more versatile, flexible and economic it is. It can be shown in general, that fewer multi-input-output logic circuits are required in designing logic networks than for logic circuits with a smaller number of inputs and outputs. Also, in designing logic circuits for switching functions, more than just the logic must be considered. The timing functions of each circuit in operation must be especially known. In switching a logic circuit of any type, a finite time interval occurs in the switching from one state of the circuit to the complementary state of the circuit. A pulse is formed by turning a logic circuit on for a short time interval and then turning it off. The pulse thereby formed has a finite delay caused by the interval required for the rise and fall time of the pulse. This delay is with respect to the input pulse initiating the switching. Therefore, in logic circuits where switching occurs in sequence, these delays can add up even though they are very short to begin with. Unequal delays in two channels which connect any point further along in the logic system means that a "racing" condition will occur. That is, information in one channel will reach the junction point before information from the other channel will. This "racing" leads to erratic errors in the logic system. In order to eliminate this "racing" in these logic circuits, time delays must be inserted in various positions in the logic system to delay the advanced pulse in a channel. This requires special additional circuits.

It is an object of this invention to provide an improved logic circuit.

It is another object of this invention to provide an improved NOR logic circuit capable of having a greater number of multi-input-output connections than hereinbefore was possible.

It is still another object of this invention to provide an improved NOR logic circuit which contains therein time delay provisions.

Further objects of this invention will become apparent from the following description taken in conjunction with the accompanying drawings. In said drawings, for illustrative purposes only, there are shown preferred embodiments of the invention.

Figure 1:
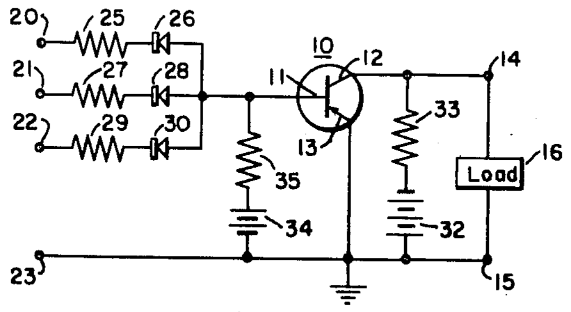
FIGURE 1 is a schematic diagram of a prior art NOR logic circuit.

Referring to FIG. 1, the NOR logic element comprises a transistor having three electrodes shown generally at 10. In this particular embodiment of the invention, a PNP transistor is employed, however, it is to be understood that an NPN transistor may also be utilized by reversing the polarity of the bias and signal voltages. Further, both germanium and silicon transistors have been employed with success. The transistor 10 is to be used in a switching mode. That is, an input signal applied between two of said three electrodes will be of sufficient magnitude to drive said transistor to saturation. A bias or supply voltage will be connected between a third and one of said two electrodes.

The PNP transistor 10 is provided with a base electrode 11, a collector electrode 12 and an emitter electrode 13. The NOR circuit element is provided with output terminals 14 and 15 across which a load 16 is connected. As shown the collector 12 is connected to the output terminal 14. The emitter 13 is connected to the output terminal 15. The emitter 13 is also connected to ground.

A plurality of input terminals 20, 21, 22 and 23 are provided. The terminal 23 is the return terminal and is connected to ground. Resistors and diodes are shown connected between the input terminals 20, 21 and 22 and the base electrode 11. Diodes are shown and described in the modifications of this application and they serve to improve the isolation of the circuits but they may be dispensed with and proper functioning of the circuits obtained.

In this embodiment of the NOR circuit element, a resistor 25 and a diode 26 are connected in series circuit relationship between the input terminal 20 and the base electrode 11. Resistor 27 and diode 28 are connected in series circuit relationship between the input terminal 21 and base electrode 11. Resistor 29 and diode 30 are connected between the input terminal 22 and the base electrode 11.

A source of power 32 is provided and connected through an impedance 33 to the collector 12. Since a PNP transistor is used in this embodiment of the invention, the source of power for supplying a bias voltage on the collector 12 will be disposed to deliver negative bias voltage. The voltage rating of the power source 32 will depend upon the conditions to be met in the logic circuit and the characteristics of the transistor 10. A temperature compensating network, including a temperature sensitive resistor 35 and a voltage source 34, is connected in series loop circuit relationship with the base electrode 11 and the emitter electrode 13 which emitter electrode is connected to ground.

A NOR logic element of this type is described in greater detail in a copending application Serial No. 628,331, entitled "Temperature Compensating Devices for NOR Elements for Control Systems," filed December 14, 1956, and assigned to the same assignee as the present invention.

Figure 2:
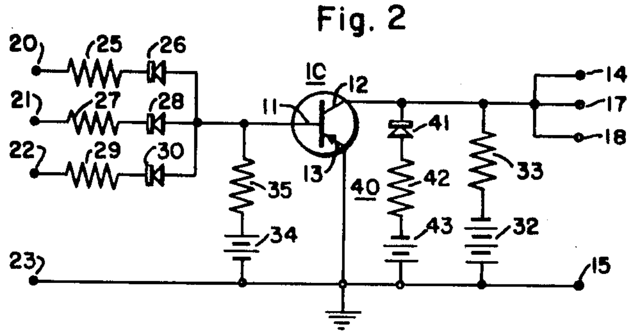
FIG. 2 is a schematic diagram of a first embodiment of the teachings of this invention.

Referring to FIG. 2, there is illustrated an embodiment of the teachings of this invention in which like components of FIGS. 1 and 2 have been given the same reference characters. The main distinction between the apparatus illustrated in FIGS. 1 and 2 is that a diode clamp network has been connected across the emitter 13 and collector 12 of the transistor 10. The clamp network comprises a voltage source 43, a resistor 42 and a rectifier 41 connected in series circuit relationship.

It can be shown mathematically that all logic, exclusive of Memory logic, can be performed on two levels, if an infinite number of inputs and outputs to a logic circuit are available. This means that in many cases fewer logic circuits are required to perform logic functions than needed otherwise. If a logic circuit can be made to accommodate more inputs and more outputs without harming the operation and sizably increasing the cost, it would therefore be more economical to do so. The diode clamp network 40 connected across the output of the NOR circuit illustrated in FIG. 2 does not interfere with the operation or logic of the NOR circuit and is quite economical. However, it allows the NOR circuit of FIG. 2 to have a much higher number of inputs and outputs than the ordinary NOR circuit hereinbefore described. The multi-input NOR circuit is a prime requirement in control circuits, and is becoming practically an absolute necessity in digital computer circuits. In addition, it is evident that the multi-input NOR circuit of FIG. 2 having the added diode clamp network 40 and the ordinary NOR circuit illustrated in FIG. 1 will be compatible with one another.

Referring again to FIG. 2, the series resistor 42 and the rectifier diode 41 are connected from the voltage source 43 to the collector 12 of the transistor 10. The diode 41 is polarized so that the cathode side of the diode is connected directly to the collector 12 of the transistor 10. The voltage source 43 is to have a magnitude sufficient to drive a succeeding transistor into saturation, through an input resistance of the succeeding transistor. The magnitude of the voltage source 32 is much greater than that of the voltage source 43 and may be chosen to be between 10 to 20 times the magnitude of the voltage source 43. This high voltage from the voltage source 32 through the resistor 33 in effect supplies a constant current to the collector 12 of the transistor 10. However, because of the rectifier diode 41, which is biased at the value of the voltage source 43, the collector 12 of the transistor 10, or the potential between the two electrodes 12 and 13, can never exceed the value of the voltage source 43. Therefore, the collector 12 of the transistor 10, during the time the transistor 10 is cut off, acts as though it were a constant current source, at the magnitude of the voltage source 43, to the load to be connected to the output terminals. Therefore, one can drive a great number of outputs to succeeding stages from this constant source output.

It should be noted that when the transistor 10 is in saturation, it sees a current equal to the magnitude of the voltage source 32 divided by the resistance of the resistor 33 through the emitter 13 and the collector 12.

The gain of the transistor 10 must be regulated at this current.

It can be shown that for one input and negligible leakage current for the transistor 10, that the number of outputs of the NOR circuit is exactly equal to the gain of the circuit if the source collector impedance is considered infinite. This arises from the fact that, if there is no leakage (no temperature compensations required), no input current drain from auxiliary input, and the voltage source dynamic impedance is infinite, the amount of output current ($I_o$) that is available to drive succeeding circuits is exactly equal to the current ($I_s$) that the transistor may conduct during saturation, i.e. $I_o=I_s$. An output drives a similar circuit which requires an input current ($I_j$) equal to the current switched during saturation divided by the gain (B) of the circuit, i.e.

$$I_i=\frac{I_s}{B}=\frac{I_o}{B}$$

It then follows that the output current is then sufficient to drive a number of succeeding inputs which is exactly equal to the transistor gain, i.e.

$$\frac{I_o}{I_i}=B$$

$I_o/I_j$ is also the ratio of current available to current drain for one input. In practice, it is possible to drive a circuit with the number of outputs equal to about half the gain of the transistor 10 with as many inputs. Therefore, a practical NOR circuit, according to this invention, and considering a transistor with a gain of 50, may have in the order of 25 inputs and 25 outputs. This is a great improvement in versatility over the NOR circuit apparatus as illustrated in FIG. 1.

It is desirable to make this source collector impedance look like a constant current source. Therefore, the value of the voltage source 32 must be much greater than the value of the voltage source 43 and the resistance of the resistor 42, equivalent resistance of the diode 41, must be as small as possible. The rectifier diode 41 should essentially be a high-back impedance, low-forward impedance diode. It may preferably be of the junction type.

Figure 6:
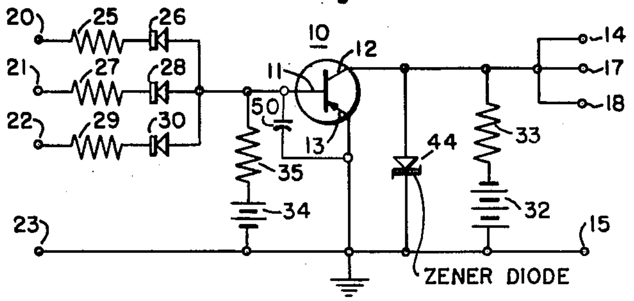
FIG. 6 is a third embodiment of the teachings of this invention.

Referring to FIG. 6 there is illustrated another embodiment of the teachings of this invention, in which like components of FIGS. 2 and 6 have been given the same reference characters. The main distinction between the apparatus illustrated in FIGS. 2 and 6 is that in FIG. 6 a Zener-type diode 44 has been substituted in the diode clamp network 40 for the diode 41, equivalent resistor 42 and the voltage source 43 of FIG. 2.

The rectifier diode 44 is of the type that has a Zener type breakdown in the reverse direction. If the rectifier diode 44 is of the Zener type, the voltage source 43 may be eliminated. If the Zener type diode is used for rectifier 41 the polarity of the diode 44 must be reversed compared to diode 41. For the same operation of the logic circuit hereinbefore described, the critical breakdown voltage of the Zener type diode 44 would be the same as the magnitude of the omitted voltage source 43. Thus the diode 43 would break down in the reverse direction and maintain a substantially constant potential between the emitter electrode 13 and the collector electrode 12.

Figure 3:
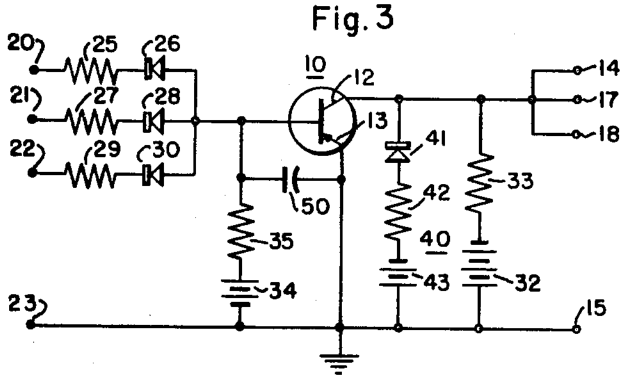
FIG. 3 is a second embodiment of the teachings of this invention.

Referring to FIG. 3, there is illustrated another embodiment of the teachings of this invention, in which like components of FIGS. 2 and 3 have been given the same reference characters. The main distinction between the apparatus illustrated in FIGS. 3 and 2 is that in FIG. 3, a capacitance or electrical energy storage means 50 has been connected directly between the emitter 13 and the base 11, or the two input electrodes, of the transistor 10.

As discussed hereinbefore, unequal delays in two logic channels which connect at any point further along in the logic system means that a "racing" condition will occur. That is, information in one channel will reach the junction point before information from the other channel will. This racing leads to erratic errors in the logic system. In order to eliminate this "racing" in these logic circuits, time delays must be inserted in various positions in the logic system to delay the advanced pulse in a channel. This requires special additional circuits. The connection of the capacitor 50 across the emitter 13 and the base 11 of the transistor 10 delays the NOR circuit input pulses by a finite time interval. Addition of the capacitor 50 causes the NOR circuit to function as its own delay line.

Figure 4:
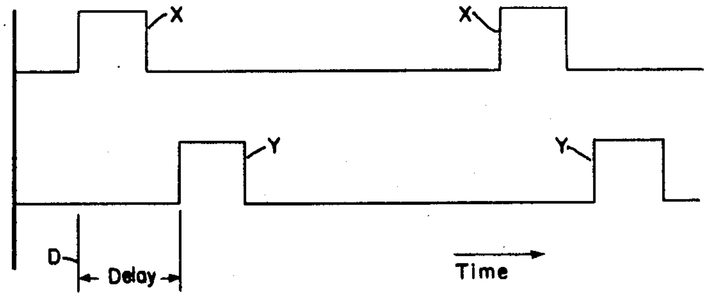
FIG. 4 is a graphical representation of wave forms present at selected points of the apparatus illustrated in FIG. 3.
Figure 5:
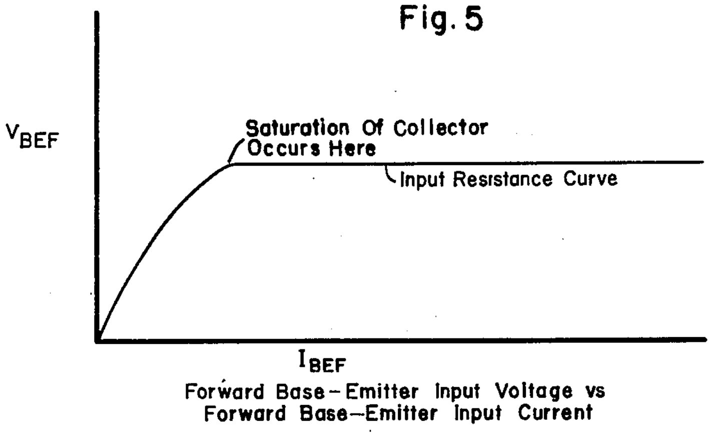
FIG. 5 is a graphical representation of a characteristic of a transistor device which may be employed in the apparatus of FIGS. 2 and 3.

Referring to FIG. 4, the pulses X would be the ordinary output of the NOR circuit without the capacitor 50 attached. By connecting the capacitor 50 into the circuit, the new pulse output Y is shown with the actual time delay D also shown in FIG. 4. The novel mechanism involved is the use of the non-linear features of the base-emitter diode of the transistor 10. A graphical representation of this input resistance curve is shown in FIG. 5. The representation of FIG. 5 plots the forward base-emitter input voltage of the diode versus the forward base-emitter input current of the diode. As shown, a definite break-point occurs at the point where collector saturation begins. This is the basis for operation of the circuit.

In operation, the capacitor 50 is charged up to the base resistance of the transistor 10 by an input pulse applied to one of the plurality of input terminals. The voltage on the base of the transistor 10 increases exponentially with time. After an interval, which is the interval of delay, the voltage of the base of the transistor 10 reaches the point where the transistor can be saturated. When the transistor 10 swings into saturation, the base resistance of the transistor 10 switches to a very low resistance. The capacitor 50 then begins to discharge through the base resistance of the transistor 10 after the input pulse ends. The voltage on the base resistance of the transistor 10 now decreases exponentially. When the voltage on the base of the transistor 10 reaches the point where it can no longer hold the transistor 10 in saturation, the transistor 10 switches back to the cut-off state. Since the voltage swings at the base of the transistor 10 are quite large as compared to that required to drive the transistor 10 into saturation, the rise and fall time of the pulses which correspond to the linear region of the transistor 10 operation are quite sharp. The delay time D is varied by correct choice of the shunting capacitor 50.

The modified embodiment of the NOR logic circuit as illustrated in FIG. 3 is very useful in the construction of logic systems using the NOR function. The addition of the capacitor 50 does not change the NOR logic, but simply adds a contro ldelay at the appropriate position in the logic system. The important feature is that, although use of capacitor for delay by integration means is well known, the method used here uses the non-linear resistance of the transistor 10 input in conjunction with the capacitor 50 to afford a time delay for the NOR circuit without interfering with the wave form. This is a novel application of this non-linear resistance.

In conclusion, it is pointed out that while the illustrated examples constitute practical embodiments of my invention, I do not limit myself to the exact details shown, since modification of the same way be varied without departing from the spirit and scope of this invention.

I claim as my invention:

1. In a logic circuit, in combination; a transistor having three electrodes; means for applying an input signal between two of said electrodes; means connecting a voltage source between a third and one of said two electrodes; and a diode clamp circuit comprising a Zener-type diode serially connected between said third and said one of said two electrodes; said voltage source and said Zener-type diode being poled such that the potential between said third and said one electrode can never exceed the critical breakdown potential of said Zener-type diode; said voltage source having a voltage magnitude at least two times greater than said critical breakdown potential.

2. In a logic circuit, in combination; a transistor having three electrodes; means for applying an input signal between two of said electrodes; means connecting a voltage source between a third and one of said two electrodes; and a diode clamp circuit comprising a Zener-type diode serially connected between said third and said one of said two electrodes; said voltage source and said Zener-type diode being poled such that the potential between said third and said one electrode can never exceed the breakdown potential of said Zener-type diode; said voltage source having a voltage magnitude at least two times greater than said breakdown potential of said Zener-type diode; said breakdown potential having a magnitude sufficient to drive a transistor of a succeeding network into saturation; said Zener-type diode being poled in the opposite direction across said third and one electrode as said voltage source.

3. In a logic circuit, in combination; a transistor having three electrodes; means for applying an input signal between two of said electrodes; means connecting a voltage source between a third and one of said two electrodes; a capacitor means directly connected between said two electrodes of said transistor; and a diode clamp circuit comprising a Zener-type diode serially connected between said third and said one of said two electrodes; said voltage source and said Zener-type diode being poled such that the potential between said third and said one electrode can never exceed the breakdown potential of said Zener-type diode; said voltage source having a voltage magnitude much greater than said breakdown potential of said Zener-type diode.

4. In a logic circuit, in combination; a transistor having three electrodes; means for applying an input signal between two of said electrodes; means connecting a voltage source between a third and one of said two electrodes; a capacitor means connected between said two electrodes of said transistor; and a diode clamp circuit comprising a Zener-type diode serially connected between said third and said one of said two electrodes; said voltage source and said Zener-type diode being poled such that the potential between said third and said one electrode can never exceed the breakdown potential of said Zener-type diode; said voltage source having a voltage magnitude much greater than said breakdown potential of said Zener-type diode; said Zener-type diode having a breakdown potential of a magnitude sufficient to drive a transistor of a succeeding network into saturation.

5. In a logic circuit, in combination; a transistor having three electrodes; means for applying an input signal between two of said electrodes; means connecting a voltage source between a third and one of said two electrodes; a capacitor connected directly between said two electrodes of said transistor; and a diode clamp circuit comprising a Zener-type diode serially connected between said third and said one of said two electrodes; said voltage source, and said Zener-type diode being poled such that the potential between said third and said one electrode can never exceed the breakdown potential of said Zener-type diode; said voltage source having a voltage magnitude at least two times greater than the breakdown potential of said Zener-type diode; said Zener-type diode having a breakdown potential of a magnitude sufficient to drive a transistor of a succeeding network into saturation; said Zener-type diode being poled in the opposite direction across said third and one electrode as said voltage source.

6. In a logic circuit, in combination; transistor means having base, emitter and collector electrodes; means for applying an input signal between said base and emitter electrodes; means connecting a voltage source between said emitter and collector electrodes; and a diode clamp circuit comprising a Zener-type diode connected between said emitter and collector electrodes; said voltage source and said Zener-type diode being poled so that the potential between said emitter and collector electrodes never exceeds the value of the breakdown potential of said Zener-type diode; said voltage source having a magnitude at least two times greater than said breakdown potential.

7. In a logic circuit, in combination; transistor means having base, emitter and collector electrodes; means for applying an input signal between said base and emitter electrodes; means connecting a voltage source between said emitter and collector electrodes; and a diode clamp circuit comprising a Zener-type diode connected between said emitter and collector electrodes; said voltage source, and said Zener-type diode being poled so that the potential between said emitter and collector electrodes never exceeds the value of the breakdown potential of said Zener-type diode; said voltage source having a magnitude at least two times greater than said breakdown potential; said Zener-type diode having a potential of a breakdown magnitude sufficient to drive a transistor of a succeeding network into saturation; said Zener-type diode being poled the opposite direction across said emitter and base electrodes as said voltage source.

8. In a logic circuit, in combination; a transistor having a base electrode, a collector electrode, and a grounded emitter electrode; circuit means, including a resistor and a series connected voltage source of a selected relatively high value, to drive a transistor of a succeeding network into saturation connected across the collector and the ground to thus be connected across the collector and emitter; a diode clamp circuit connected across the collector and emitter and having characteristics to maintain the collector voltage constant at a relatively low voltage value during the cut-off condition of the transistor; and a capacitor connected directly across the base and emitter to provide pulse time delay for pulse signals applied across the base and emitter.

References Cited in the file of this patent

UNITED STATES PATENTS

| | | |
|---|---|---|
| 2,603,746 | Burkhart | July 15, 1952 |
| 2,845,548 | Silliman et al. | July 29, 1958 |
| 2,880,330 | Linvill | Mar. 31, 1959 |
| 2,892,103 | Scarbrough | June 23, 1959 |

OTHER REFERENCES

A Digital to Analogue Shaft Converter, by Harry Margulius and Paul M. Cable, a thesis submitted at the Massachusetts Institute of Technology, June 1957, published March 1, 1956, pages 47 and 49.